United States Patent
Deschenes et al.

(10) Patent No.: US 10,421,501 B2
(45) Date of Patent: Sep. 24, 2019

(54) LOADING PLATFORM FOR WHEELED VEHICLES

(71) Applicant: SERVICE D'ÉQUIPEMENT G.D. INC., Québec (CA)

(72) Inventors: Guy Deschenes, Québec (CA); Stéphane Ouellet, Québec (CA)

(73) Assignee: SERVICE D'ÉQUIPEMENT G.D. INC., Quebec (CA)

( * ) Notice: Subject to any disclaimer, the term of this patent is extended or adjusted under 35 U.S.C. 154(b) by 228 days.

(21) Appl. No.: 15/211,701

(22) Filed: Jul. 15, 2016

(65) Prior Publication Data
US 2017/0057394 A1 Mar. 2, 2017

Related U.S. Application Data

(60) Provisional application No. 62/210,220, filed on Aug. 26, 2015.

(51) Int. Cl.
*B62D 33/00* (2006.01)
*B62D 33/02* (2006.01)
(Continued)

(52) U.S. Cl.
CPC ............ *B62D 33/02* (2013.01); *B60P 1/32* (2013.01); *B60P 3/00* (2013.01); *B60P 3/06* (2013.01); *B60P 3/07* (2013.01); *B60P 3/08* (2013.01); *B60P 3/12* (2013.01); *B60P 3/122* (2013.01); *B62D 21/00* (2013.01); *B62D 21/02* (2013.01); *B62D 21/09* (2013.01); *B62D 21/20* (2013.01); *B62D 33/00* (2013.01)

(58) Field of Classification Search
CPC ........ B62D 33/02; B62D 21/20; B62D 21/08; B62D 21/06; B62D 21/03; B62D 33/00; B62D 21/00; B62D 21/02; B62D 21/09; B60P 1/32; B60P 3/12; B60P 3/122; B60P 3/06; B60P 3/00; B60P 3/08; B60P 3/07
USPC ............. 52/664, 666; 280/785, 789, 794; 105/413, 414, 419; 410/4, 24, 26; 296/184.1, 187.08, 193.07, 204; 298/12, 298/22 R, 22 P; 414/480, 482–483
See application file for complete search history.

(56) References Cited

U.S. PATENT DOCUMENTS

| 1,969,844 A | * | 8/1934 | Heath | B61D 45/008 105/418 |
| 4,795,303 A | * | 1/1989 | Bubik | B60P 3/122 410/29.1 |

(Continued)

FOREIGN PATENT DOCUMENTS

| EP | 0915006 A2 | 5/1999 |
| WO | 8908567 A1 | 9/1989 |

*Primary Examiner* — Stephen T Gordon
(74) *Attorney, Agent, or Firm* — Price Heneveld LLP (57) ABSTRACT

A loading platform for a wheeled vehicle. The loading platform comprises a frame extending along a longitudinal axis. The frame comprises an elongated central shell having two spaced-apart elongated beams with an upper end and an elongated central plate secured to and connecting the upper ends of the spaced-apart elongated beams. The frame also comprises cross bracing assemblies extending on opposed sides of the elongated central shell, each one of the cross bracing assemblies including a plurality of intersecting bracing plates secured at a proximal end to a respective one of the elongated beams of the central shell.

20 Claims, 9 Drawing Sheets

(51) Int. Cl.
*B60P 3/06* (2006.01)
*B60P 3/07* (2006.01)
*B60P 1/32* (2006.01)
*B60P 3/08* (2006.01)
*B60P 3/00* (2006.01)
*B60P 3/12* (2006.01)
*B62D 21/09* (2006.01)
*B62D 21/02* (2006.01)
*B62D 21/00* (2006.01)
*B62D 21/20* (2006.01)

(56) References Cited

U.S. PATENT DOCUMENTS

| | | | |
|---|---|---|---|
| 4,872,728 A | 10/1989 | Adams | |
| 5,501,504 A * | 3/1996 | Kunz | B62D 21/02 280/783 |
| 5,967,733 A | 10/1999 | Cash | |
| 6,450,742 B1 * | 9/2002 | Jenkins | B60P 3/08 410/24 |
| 2010/0021276 A1 | 1/2010 | Baughman | |

* cited by examiner

LOADING PLATFORM FOR WHEELED VEHICLES

CROSS REFERENCE TO RELATED APPLICATION

This application claims the benefit under 35 U.S.C. § 119(e) of U.S. provisional patent application No. 62/210,220 which was filed on Aug. 26, 2015. The entirety of the aforementioned application is herein incorporated by reference.

TECHNICAL FIELD

The present invention relates to the field of platforms for wheeled vehicles. More particularly, it relates tilting platforms for wheeled vehicles which tilt to provide a loading angle for loading equipment, vehicles, and the like and which level for transporting the equipment, vehicles, and the like.

BACKGROUND

In the field of vehicle transport, it is known to provide vehicles with a tiltable loading platform (i.e. roll-back type platforms) in order to load and transport vehicles or equipment of all kinds. More particularly, such vehicles typically include a load support surface supported upon a truck bed frame. The load support surface is pivotable relative to the truck bed frame or trailer frame between a transport configuration, where the load support surface extends parallel to the bed frame, and a loading/unloading configuration, where the load support surface extends at an oblique angle relative to the bed/trailer frame and contacts the ground to define an approach angle.

Known vehicles with a tiltable loading platform however tend to suffer from several drawbacks. Typical loading platforms include main beams extending along the longitudinal axis of the loading platform, cross sills extending substantially perpendicular to the main beams and supported by same, and a floor extending above the cross sills, as described in U.S. Pat. No. 3,414,148. Thus, due to the superposition of the main beams and the cross sills, a conventional loading platform is usually about 9 inches thick.

In view of the above, the thickness of the known loading platforms commonly results in the loading platforms having an approach angle in the loading/unloading configuration that is somewhat steep and, therefore, it can be difficult to move vehicles onto the support surface due to the ground clearance of the vehicle and/or the force of gravity. Hence, it is desirable to provide a vehicle with a tiltable loading platform having a softer approach angle in the loading/unloading configuration. For example and without being limitative, one of the possible solutions to reduce the approach angle consists of reducing the thickness of the loading platform while still preventing the platform from bending under the weight of large vehicle or equipment which can be conveyed thereon. Moreover, reducing the thickness of the loading platform of such vehicles can also be advantageous to carry higher vehicles or equipment and lowering the center of gravity.

In view of the above, there is a need for an improved loading platform for wheeled vehicle which, by virtue of its design and components, would be able to overcome or at least minimize some of the above-discussed prior art concerns.

BRIEF SUMMARY OF THE INVENTION

According to a first general aspect, there is provided a loading platform for a wheeled vehicle. The loading platform comprises a frame extending along a longitudinal axis and having spaced-apart longitudinal edges. The frame comprises a load-supporting floor including a central plate and a rear floor plate and a lattice frame assembly extending below and supporting the load-supporting floor. The lattice frame assembly comprises two spaced-apart elongated beams with an upper end. The central plate of the load-supporting floor is secured to and connects the upper ends of the spaced-apart elongated beams. The spaced-apart elongated beams and the central plate define together an elongated central shell having a central shell forward end and a central shell rear end. The lattice frame assembly further comprises a front end cross member extending between the spaced-apart longitudinal edges of the frame and secured to the spaced-apart elongated beams of the elongated central shell at the central shell forward end. The rear floor plate extends transversally between the two spaced-apart longitudinal edges of the frame and is substantially levelled with the central plate.

In an embodiment, the central plate secured to the upper end of each one of the elongated beams comprises a V-shaped plate defining a depression extending along the longitudinal axis.

In an embodiment, the rear floor plate is a single piece component wider than the central plate along a transversal axis extending perpendicular to the longitudinal axis of the frame.

In an embodiment, the front end cross member and the rear floor plate are made of low carbon steel having at least one of a tensile strength of at least about 175 Ksi, a yield strength of at least about 145 Ksi, a hardness of at least about 350 BHN, a transverse bending radius of at least about 3 t and a parallel bending radius of at least about 4 t.

In an embodiment, the elongated beams and the central plate are single piece.

In an embodiment, the two spaced-apart elongated beams of the elongated central shell are one of C-Shaped elongated beams and Z-Shaped elongated beams.

In an embodiment, the lattice frame assembly further comprises cross bracing assemblies extending on opposed outer sides of the elongated central shell. Each one of the cross bracing assemblies includes a plurality of intersecting bracing plates secured at a proximal end to a respective one of the elongated beams of the central shell.

In an embodiment, the intersecting bracing plates of each one of the cross bracing assemblies are arranged in a criss-cross pattern and the frame further comprises lateral floor plates. Each one of the lateral floor plates extends longitudinally on a respective side of the central plate, is supported by and secured to a respective one of the cross bracing assemblies and is substantially levelled with the central plate.

In an embodiment, the lattice frame assembly further comprises two longitudinally extending outer beams. Each one of the longitudinally extending outer beams has an upper end and extends on an outer side of a respective one of the cross bracing assemblies and the plurality of intersecting bracing plates of the respective one of the cross bracing assemblies is secured at a distal end to a respective one of the longitudinally extending outer beams.

In an embodiment, the lattice frame assembly further comprises at least one transversally extending support member extending continuously between the two longitudinally extending outer beams. The at least one transversally extending support member supporting and is secured to the rear floor plate.

In an embodiment, the load-supporting floor further comprises two forward end plates extending rearwardly from the central shell forward end. Each one of the forward end plates is secured, at a first end, to the upper end of a respective one of elongated beams of the elongated central shell and, at a second end, to the upper end of a respective one of the two longitudinally extending outer beams. Each one of the forward end plates extends laterally on a respective side of the central plate and is secured to the front end cross member.

In an embodiment, the two forward end plates are made of low carbon steel having at least one of a tensile strength of at least about 175 Ksi, a yield strength of at least about 145 Ksi, a hardness of at least about 350 BHN, a transverse bending radius of at least about 3 t and a parallel bending radius of at least about 4 t.

In an embodiment, the load-supporting floor further comprises two lateral floor plates. Each one of the two lateral floor plates covers a respective one of the cross bracing assemblies and has a first marginal edge secured to the upper end of a respective one of the two longitudinally extending outer beams and a second marginal end secured to the upper end of a respective one of the two elongated beams of the elongated central shell.

In an embodiment, the platform has a platform forward end and a platform rear end. The central shell forward end is substantially aligned longitudinally with the platform forward end and the central shell rear end extends forwardly of the platform rear end.

According to another general aspect, there is also provided a tiltable loading platform for a wheeled vehicle having a vehicle subframe. The tiltable loading platform comprises a frame extending along a longitudinal axis and having spaced-apart longitudinal edges. The frame defines a forward end section, a rearward end section, and a central section extending between the forward end section and the rearward end section. The frame comprises: a load-supporting floor including a central plate; and a lattice frame assembly extending below and supporting the load-supporting floor. The lattice frame assembly comprises two spaced-apart elongated beams with an upper end and the central plate of the load-supporting floor secured to and connecting the upper ends of the spaced-apart elongated beams. The spaced-apart elongated beams and the central plate define together an elongated central shell with a translation path extending inbetween the spaced-apart elongated beams in the central section of the frame. The translation path is unobstructed. The tiltable loading platform also comprises a displacement system mounted to the vehicle subframe and having arms. Each one of the arms is translatably mounted to a respective one of the spaced-apart elongated beams and translating along the translation path.

In an embodiment, the forward end section, the rearward end section and the central section each have a length and the length of the central section is greater than the length of the forward end section and the rearward end section.

In an embodiment, the central section is free of transversal member extending continuously between the longitudinal edges.

In an embodiment, transversally and continuously extending transversal members are provided solely in the forward end section and the rear end section.

In an embodiment, the central plate secured to the upper end of each one of the elongated beams comprises a V-shaped plate defining a depression extending along the longitudinal axis.

In an embodiment, the elongated beams and the central plate are single piece.

In an embodiment, the lattice frame assembly further comprises cross bracing assemblies extending on opposed outer sides of the elongated central shell. Each one of the cross bracing assemblies includes a plurality of intersecting bracing plates secured at a proximal end to a respective one of the elongated beams of the central shell.

According to another general aspect, there is further provided a loading platform for a wheeled vehicle. The loading platform comprises a frame extending along a longitudinal axis. The frame comprises an elongated central shell having two spaced-apart elongated beams with an upper end and an elongated central plate secured to and connecting the upper ends of the spaced-apart elongated beams. The frame also comprises cross bracing assemblies extending on opposed sides of the elongated central shell, each one of the cross bracing assemblies including a plurality of intersecting bracing plates secured at a proximal end to a respective one of the elongated beams of the central shell.

In an embodiment, the intersecting bracing plates of each one of the cross bracing assemblies are arranged in a criss-cross pattern and the frame further comprises lateral floor plates. Each one of the lateral floor plates extends longitudinally on a respective side of the central plate, is supported by and secured to a respective one of the cross bracing assemblies and is substantially levelled with the central plate.

In an embodiment, the central plate and the lateral floor plates are single piece.

In this specification, the terms "forward" and "rearward" are interpreted with respect to a travel direction of the self-propelled vehicle.

In this specification, the terms "horizontal" and "vertical" are interpreted with respect to a transport configuration of the platform wherein the latter extends substantially parallel to a road. Furthermore, the terms "horizontal" and "vertical" are interpreted as substantially horizontal and vertical respectively.

In this specification, the term "single piece" is understood not to include two components being secured to one another with securing methods, such as, for example, by welding, but rather to refer to components being produced as a single piece, for example and without being limitative, by manufacturing processes such as casting, laminating, machining, or the like.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the loading platform and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the loading platform, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Referring to the drawings and, more particularly, referring to FIGS. 1, 2, 7 and 9, there is shown a tiltable platform 20 engaged with a sub-frame 21. The sub-frame 21 is engageable with and securable to a frame (not shown) of a wheeled and self-propelled vehicle (not shown), such as a truck, or to a frame of a trailer (not shown) towable by a wheeled and self-propelled vehicle (not shown), such as a truck used as a towing engine. When the tiltable platform 20 is mounted to the frame of a trailer or a semi-trailer, the towing engine can be a semi-trailer truck, or truck tractor, having an articulated trailer coupling, such as a fifth wheel coupling (i.e. a horse-shoe shaped coupling device), for receiving the trailer or the semi-trailer and pulling same. One skilled in the art will understand that the sub-frame 21 is engageable with and securable to either the truck bed frame or the trailer (semi-trailer) frame with the tiltable platform 20 extending above the sub-frame 21 and the truck bed frame or the trailer (semi-trailer) frame.

The tiltable platform 20 extends along a longitudinal axis L between a platform forward end 22 and a platform rear end 24. The tiltable platform 20 is pivotally engaged to the sub-frame 21, at a section proximate to the platform rear end 24, i.e. closer to the platform rear end 24 than the platform front end 22. The pivotal engagement of the tiltable platform 20 with the sub-frame 21 allows the tiltable platform 20 to be configured in a loading/unloading configuration (not shown), wherein the platform 20 is angled with respect to the sub-frame 21 and to the truck bed frame or the trailer frame, and a transport configuration (as shown in the Figures) wherein the platform 20 extends substantially parallel to the sub-frame 21 and to the truck bed frame or the trailer frame and is supported by same. In the loading/unloading configuration, the platform 20 defines an oblique angle with respect to the road.

Figure 7:
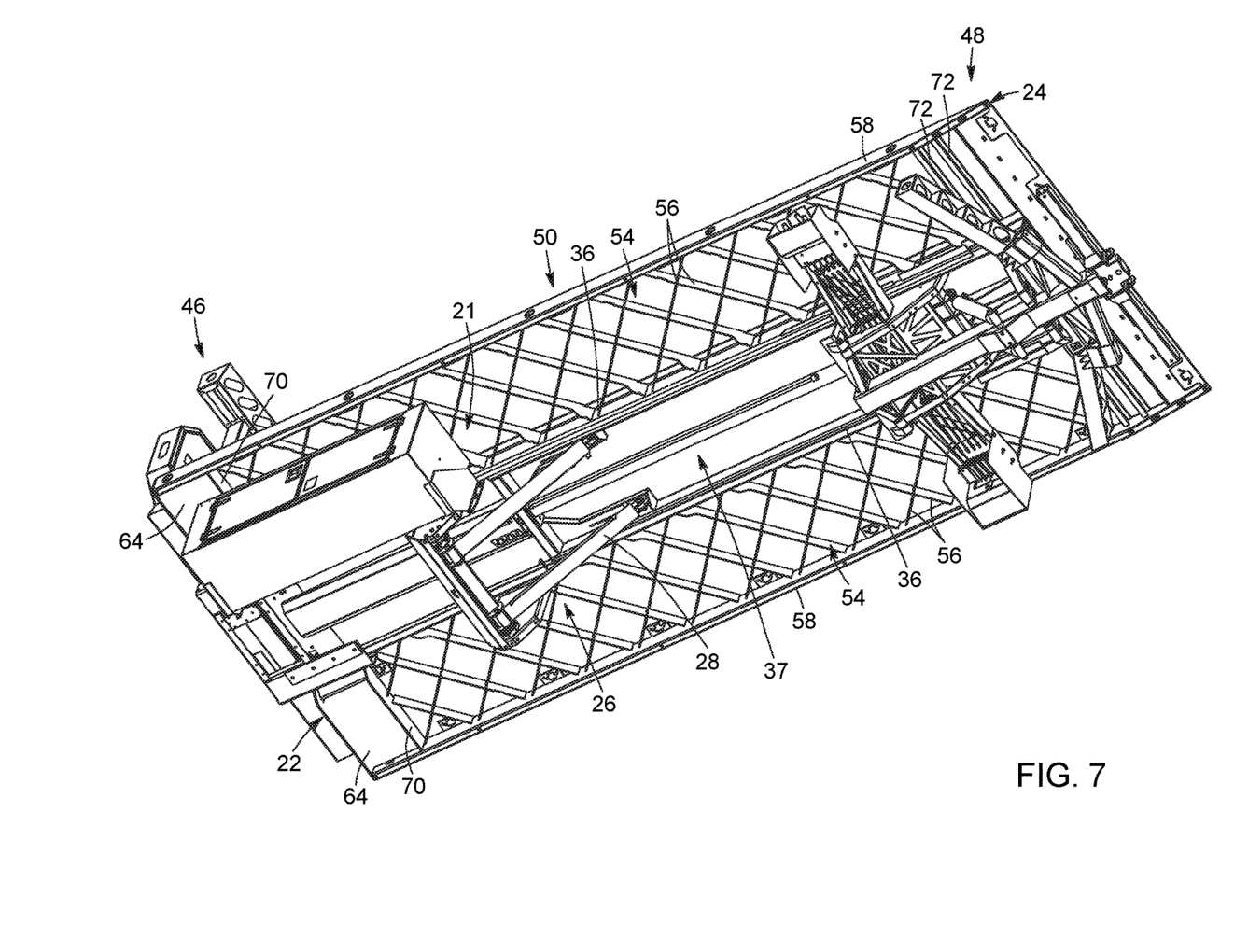
FIG. 7 is a bottom perspective view of the loading platform shown in FIG. 1.

As shown more clearly in FIG. 7, the tiltable platform 20 is engaged with the sub-frame 21 through a displacement system 26 allowing displacement of the tiltable platform 20 relative to the sub-frame 21. Displacement systems are known in the art and need not be described in details herein. For example and without being limitative, in the embodiment shown, the displacement system 26 includes hydraulic cylinders 28 with translatable pistons. In the embodiment shown, the hydraulic cylinders 28 are fixed at one end to sub-frame 21 and the pistons are fixed at an opposed end to the tiltable platform 20 (or vice-versa), or more particularly to a respective one of an intermediate beam 36 of an elongated central shell 34, which will be described in more details below. One skilled in the art will understand that, in alternative embodiments, the displacement system 26 can include other types of arms.

In operation, in order to move the platform 20 to the loading/unloading configuration (not shown), the platform 20 is initially driven rearwardly relative to the sub-frame 21 towards a rearward position wherein a rear portion of the platform 20 is positioned rearwardly relative to the sub-frame 21. Once the platform 20 reaches the rearward position, the platform 20 is pivoted (angled) relative to the sub-frame 21 such that the rear portion of the platform 20 is positioned below the sub-frame 21 and contacts the ground.

Figure 1:
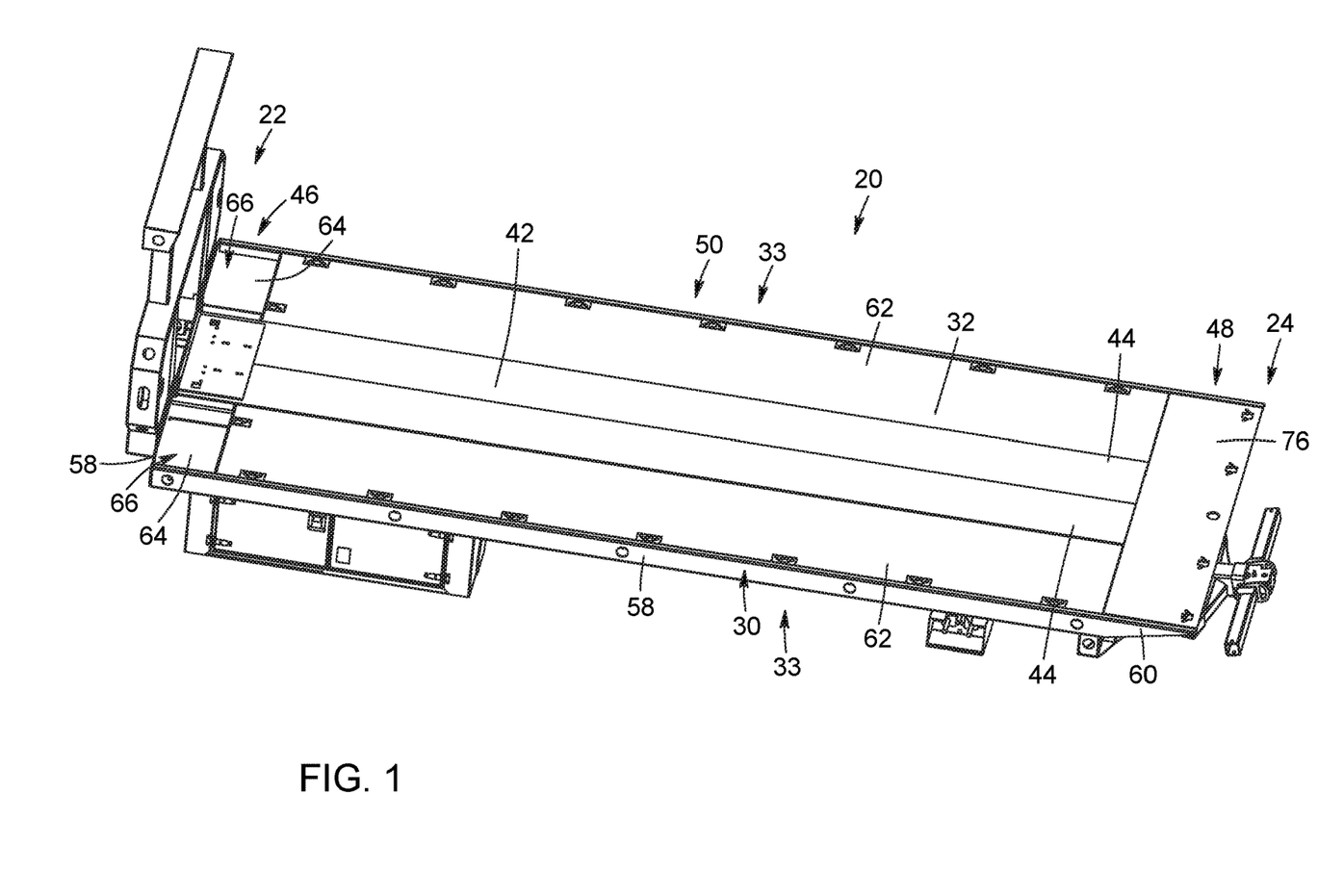
FIG. 1 is a top perspective view of a loading platform mounted to a sub-frame, in accordance with an embodiment.
Figure 2:
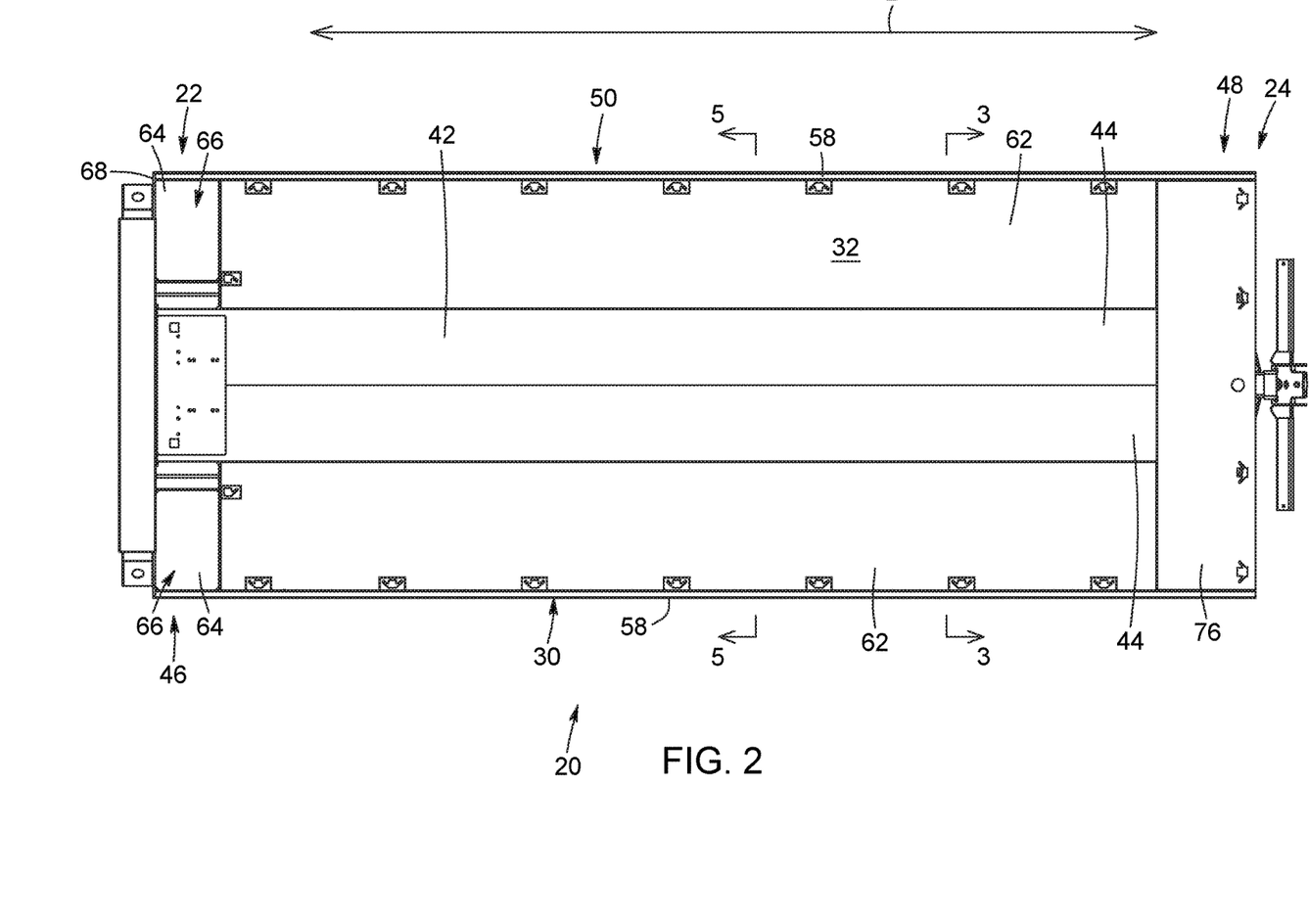
FIG. 2 is a top plan view of the loading platform shown in FIG. 1.
Figure 3:
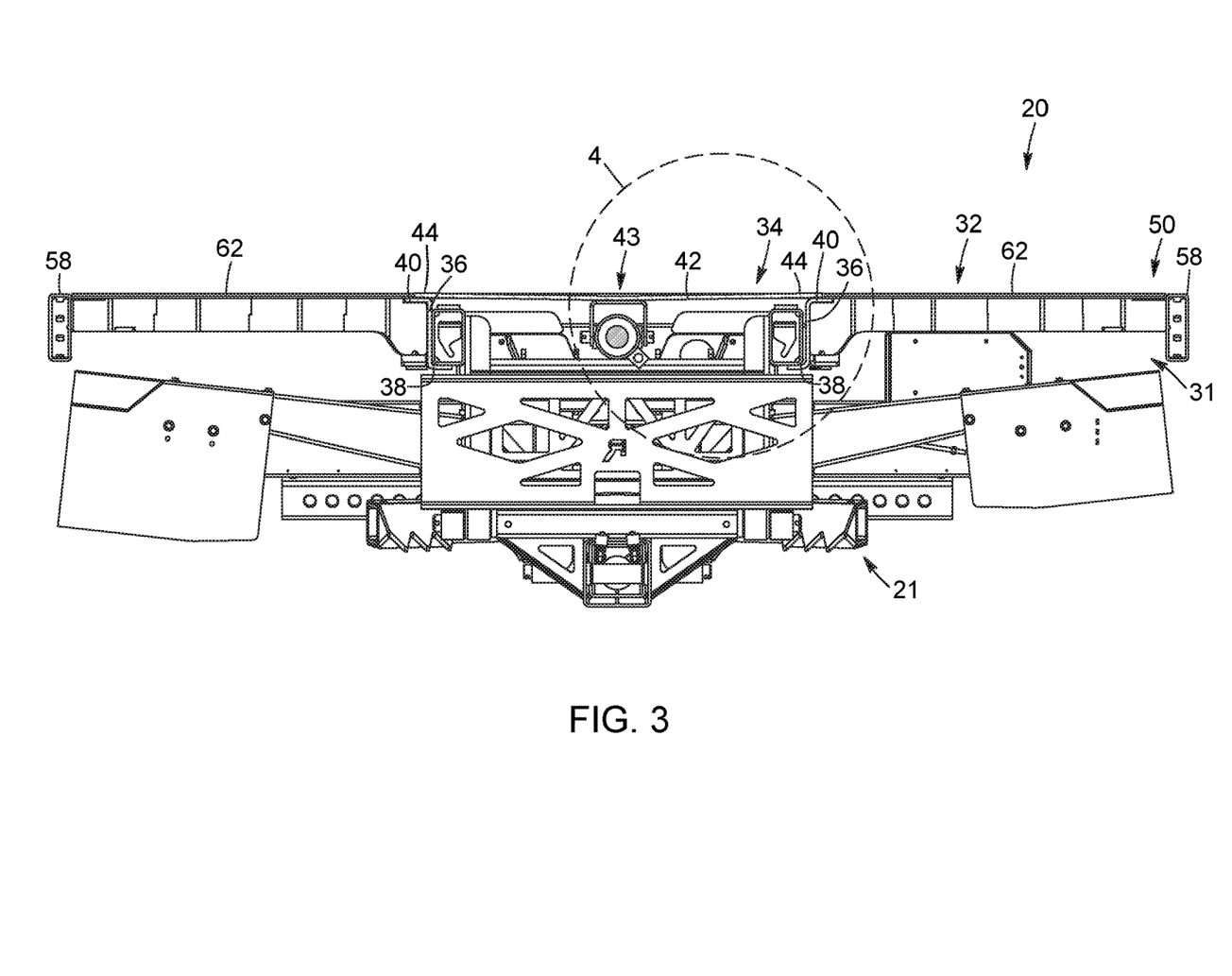
FIG. 3 is a sectional view taken along section lines 3-3 of FIG. 2 of the loading platform shown in FIG. 1.

Referring to FIGS. 1 and 2, there is shown that the tiltable platform 20 has a frame 30 including a lattice frame assembly 31 and a load-supporting floor 32, supported by the lattice frame assembly 31. In an embodiment, the lattice frame assembly 31 is a single thickness assembly, i.e. the lattice frame assembly 31 is made of components being substantially vertically aligned along a same plane, without being superposed to one another vertically.

The frame 30 extends transversally along spaced-apart longitudinal edges 33. Along the longitudinal axis L, the frame 30 can be divided into a forward end section 46 including the platform front end 22, a rearward end section 48 including the platform rear end 24, and a central section 50, extending between the forward end and rearward end sections 46, 48. In an embodiment, the central section 50 has a length greater than the length of the forward end section 46 and the rearward end section 48. In an embodiment, the length of the central section 50 is longer than a sum of the lengths of the forward and the rearward end sections 46, 48. In an embodiment, the length of the central section 50 covers at least 80% of the length of the frame 30.

Referring now to FIGS. 3 to 7, there is provided an elongated central shell 34 extending along the longitudinal axis L. The central shell 34 is defined by a combination of features of the lattice frame assembly 31 and the load-supporting floor 32. As can be seen more clearly in FIGS. 7 to 9, the elongated central shell 34 extends in the forward end section 46 of the frame 30 and has a forward end 34a, located in the forward end section 46, and a rear end 34b. In the embodiment shown, the forward end 34a of the central shell 34 is substantially aligned longitudinally with the platform forward end 22. In the embodiment shown, the rear end 34b of the elongated central shell 34 is located at a junction of the rearward end section 48 and the central section 50, i.e. the rear end 34b of the elongated central shell 34 is located forwardly of the rearward end section 48.

In the embodiment shown, the elongated central shell 34 includes two intermediate longitudinally extending beams 36 (or profiles), spaced apart from one another. In the embodiment shown, as clearly seen in FIGS. 5 and 6, the intermediate beams 36 are Z-shaped beams having a lower transversal section 38 pointing towards one another and an upper transversal section 40 pointing away from one another. It is appreciated that, in an alternative embodiment, the intermediate beams 36 can have a configuration different that the Z-shape beams of the embodiment shown. For example and without being limitative, in an embodiment (not shown), the intermediate beams can be C-shaped beams (or profiles), where both the upper transversal sections 40 and the lower transversal sections 38 point towards one another.

In the embodiment shown, the elongated central shell 34 also includes a central plate 42 connecting the intermediate beams 36 at an upper end thereof. The central plate 42 is part of the load-supporting floor 32 of the platform 20. In the embodiment shown, the central plate 42 is a V-shaped plate (i.e. a plate having a V-shaped configuration with a depression 43 extending along the longitudinal axis L and inclined towards a center of the central plate 42) (better shown in FIG. 4) and has longitudinal marginal edge regions 44 connected to the upper transversal sections 40 (or the upper ends) of the intermediate beams 36. The central plate 42 defines a central section of the load-supporting floor 32 of the platform 20. In an embodiment, the depression 43 has a depth of at least about 0.25 inch and the central plate 42 defines an angle of about 178.5° or less. In an embodiment, the, the depression 43 has a depth of between about 0.25 inch and about 0.5 inch.

In the embodiment shown, the "V" shape of the central plate 42 (i.e. the depression 43 defined centrally of the V-shaped central plate 42, along the longitudinal axis L) increases the torsional rigidity of the frame 30 of the tiltable platform 20. The depression 43 defined by the V-shaped central plate 42 in the upper surface of the load-supporting floor 32 can also be used to recover liquids such as oil, when carrying vehicles. However, it will be understood that, in an alternative embodiment (not shown), the central plate 42 can present a different configuration than a V-shaped configuration. For example, in an embodiment (not shown), the central plate 42 can be substantially flat.

In an embodiment, the longitudinal marginal edge regions 44 of the central plate 42 are secured to the upper transversal sections 40 (or the upper ends) of the intermediate beams 36. In a non-limitative embodiment, the longitudinal marginal edge regions 44 of the central plate 42 are welded to the upper transversal sections 40 of the intermediate beams 36.

One skilled in the art, will however understand that, in an alternative embodiment (not shown), the elongated central shell 34 can be defined by a C-shaped profile having a horizontally extending section and two vertically-extending sections (corresponding to the vertically-extending sections of beams 36 shown in the drawings). Thus, in this embodiment, the two transversally spaced-apart intermediate beams 36 are single piece with the central plate 42. Hence, for example and without being limitative, the central plate 42 and the intermediate beams 36 can define a single elongated piece extending along the longitudinal axis L and having opposed longitudinal sides connected by a central plate 42 integral therewith. In an embodiment, the C-shaped profile can further include lower transversal sections extending substantially horizontally and pointing towards one another (corresponding to the lower transversal section 38 shown in the drawings).

In view of the above, it will be understood that, in the embodiment shown, the central plate 42, connected to the upper end of the upper transversal sections 40 is the only connection between the intermediate beams 36, along the length of the elongated central shell 34 (i.e. along the section of the frame 30 extending between the forward end 34a and the rear end 34b of the elongated central shell 34). In other words, the elongated central shell 34 defines a translation path 37 extending inbetween the intermediate beams 36 and below the central plate 42, in the central section 50 of the frame 30. The translation path 37 is unobstructed between the spaced-apart intermediate beams 36. In an embodiment, the elongated central shell 34 is free of cross member connecting the intermediate beams 36 along the length defined between the forward end 34a and the rear end 34b thereof, thereby defining an interrupted clearance space between the intermediate beams 36 and below the central plate 42. In an embodiment, the interrupted clearance space is defined by a height corresponding substantially to the height of the intermediate beams 36 (i.e. to a distance between the lower transversal sections 38 and the upper transversal sections 40 thereof) and the length of the elongated central shell 34 (i.e. the distance between the forward end 34a and the rear end 34b of the elongated central shell 34 along the longitudinal axis L).

Figure 8:
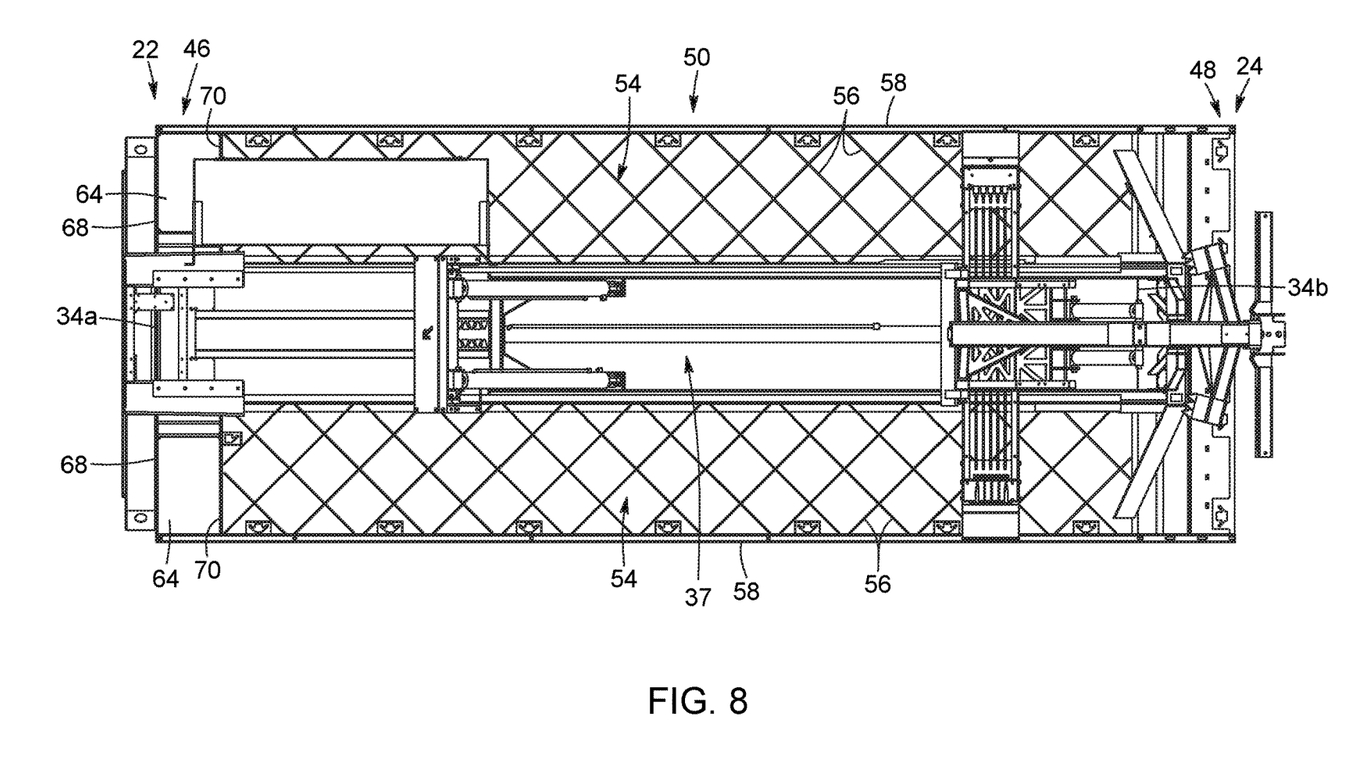
FIG. 8 is a bottom plan view of the loading platform shown in FIG. 1.
Figure 9:
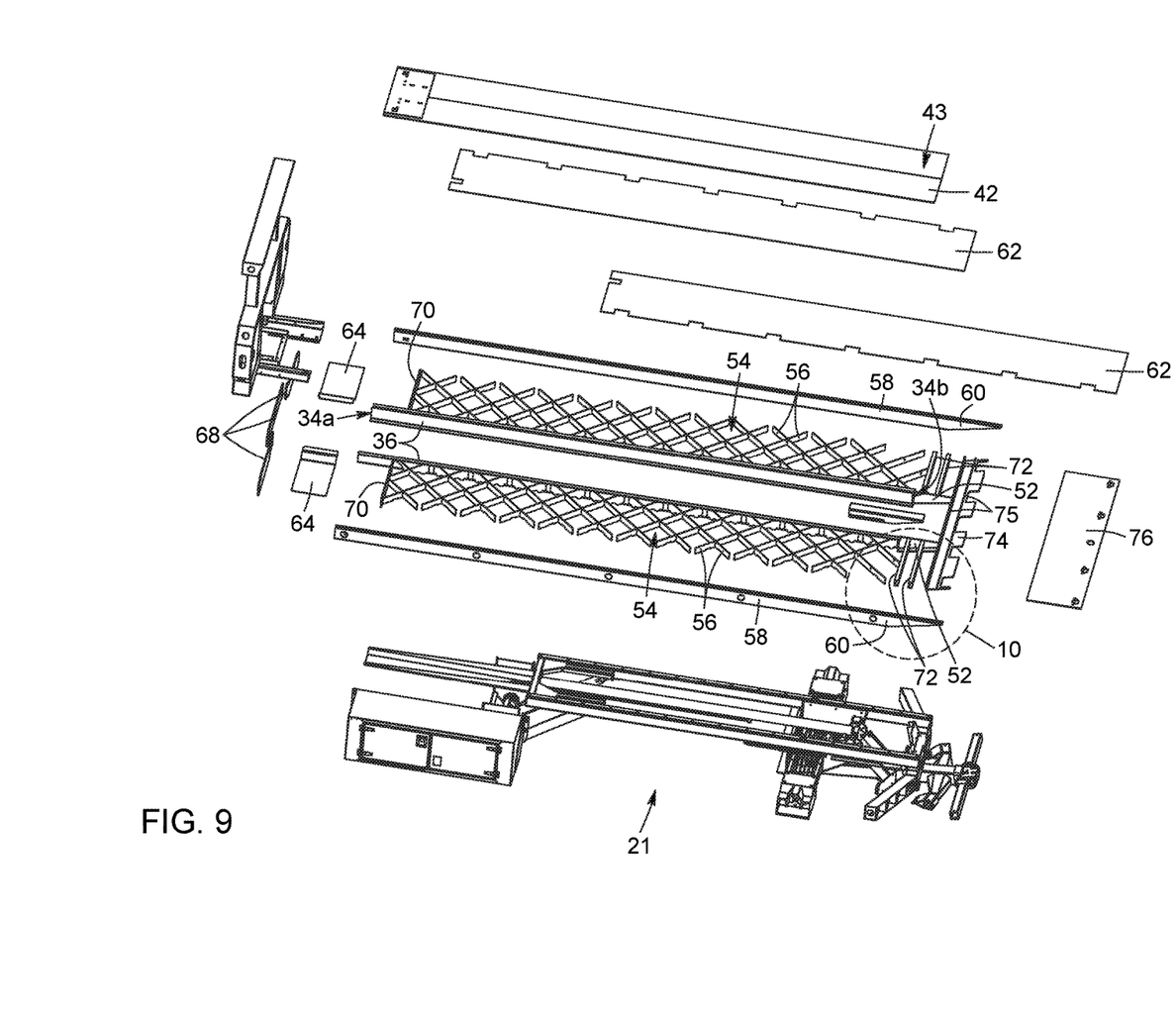
FIG. 9 is an exploded perspective view of the loading platform shown in FIG. 1.

Referring to FIGS. 7 to 9, there is shown that, in the central section 50, the lattice frame assembly 31 of the frame 30 further comprises cross bracing assemblies 54 extending on each lateral side of the elongated central shell 34. The cross bracing assemblies 54 being similar, for ease of description, only one of the cross bracing assemblies 54 will be described in further details in the description below. In an embodiment, the central section 50 is free of transversal member extending continuously between the longitudinal edges of the frame 30.

In an embodiment, the cross bracing assemblies 54 include a plurality of intersecting bracing plates 56 where each one of the intersecting bracing plates 56 is connected to at least another one orthogonally disposed intersecting bracing plate 56. In the embodiment shown, each one of the intersecting bracing plates 56 is connected to at least two other orthogonally disposed intersecting bracing plates 56, but one skilled in the art will understand that, in alternative embodiment, each one of the intersecting bracing plates 56 can be connected to more or less than two orthogonally disposed intersecting bracing plates 56.

In an embodiment, the intersecting bracing plates 56 are engaged in an interlocking intersecting relationship with the orthogonally disposed intersecting bracing plates 56. In order to allow such interlocking intersecting relationship, in an embodiment, the intersecting bracing plates 56 include at least one and, in an embodiment, at least two upwardly or downwardly extending slots 57 (see FIG. 10) extending either from a lower edge or an upper edge of the bracing plates 56. In an embodiment, the length of the slots 57 substantially corresponds to half the height of the bracing plates 56.

To interlock the intersecting bracing plates 56, the intersecting bracing plates 56 are engaged with other bracing plates 56 in a perpendicular orientation with aligned slots 57 (i.e. the upwardly extending slots 57 of a subset of the bracing plates 56 are engaged with a respective downwardly extending slot 57 of a subset of intersecting bracing plates 56), until the inner ends of the engaged slots 57 abut with one another. In an embodiment, the intersecting and interlocked bracing plates 56 are subsequently welded together, at least partially, along their interconnection.

In an embodiment, the intersecting bracing plates 56 define an oblique angle with the longitudinal axis L and the intermediate beams 36 of the elongated central shell 34. In view of the above and as can be seen in FIGS. 7 to 9, in the embodiment shown, the intersecting bracing plates 56 of the cross bracing assemblies 54 are arranged in a criss-cross pattern.

In an embodiment, the cross bracing assemblies 54 have a thickness substantially similar to the height of the intermediate beams 36 (i.e. to the distance between the lower transversal sections 38 and the upper transversal sections 40 thereof). In other words, in an embodiment, the bracing plates 56 of the cross bracing assemblies 54 have a height substantially similar to the height of the intermediate beams 36.

In an embodiment, the lattice frame assembly 31 of the frame 30 also includes two longitudinally extending outer beams 58 extending from the platform forward end 22 to the platform rear end 24, along the spaced-apart longitudinal edges 33. In an embodiment, each one of the two longitudinally extending outer beams 58 includes a tapered end section 60 in the rearward end section 48. The angle of the tapered end section 60 substantially corresponds to the approach angle of the platform 20 in the loading/unloading configuration. The longitudinally extending outer beams 58 are mounted on an outer side of a respective one of the cross bracing assemblies 54, with a proximal end of the bracing plates 56 being secured to a respective one of the intermediate beams 36, on an outer surface thereof, and a distal end of the bracing plates 56 being secured to the longitudinally extending outer beams 58, on an inner surface thereof, for example and without being limitative by welding.

In the embodiment shown, the longitudinally extending outer beams 58 are HSS-shaped beams with a rectangular cross-section. However, one skilled in the art will understand that, in alternative embodiment, the shape of the longitudinally extending outer beams 58 can vary from the embodiment shown.

In an embodiment, each one of the cross bracing assemblies 54 is covered by a lateral floor plate 62 of the load-supporting floor 32. In the embodiment shown, the lateral floor plates 62 of the load-supporting floor 32 includes marginal edge regions secured to the upper transversal sections 40 (or the upper ends) of the intermediate beams 36 and the upper ends (or sections) of the longitudinally extending outer beams 58, for example and without being limitative by welding. In an embodiment, the lateral floor plates 62 can also be secured to the bracing plates 56 extending below. For instance and without being limitative, the lateral floor plates 62 and the bracing plates 56 can be spot welded together.

In an embodiment, the upper surfaces of the lateral floor plates 62 are substantially leveled with the upper surface of the adjacent central plate 42 of the elongated central shell 34. One skilled in the art will however understand that, in alternative embodiments (not shown), the upper surfaces of the lateral floor plates 62 can extend slightly above or below the upper surface of the adjacent central plate 42. In an embodiment, the lateral floor plates 62 and the central plate 42 are single piece, i.e. the lateral floor plates 62 and the central plate 42 are unitary.

Figure 4:
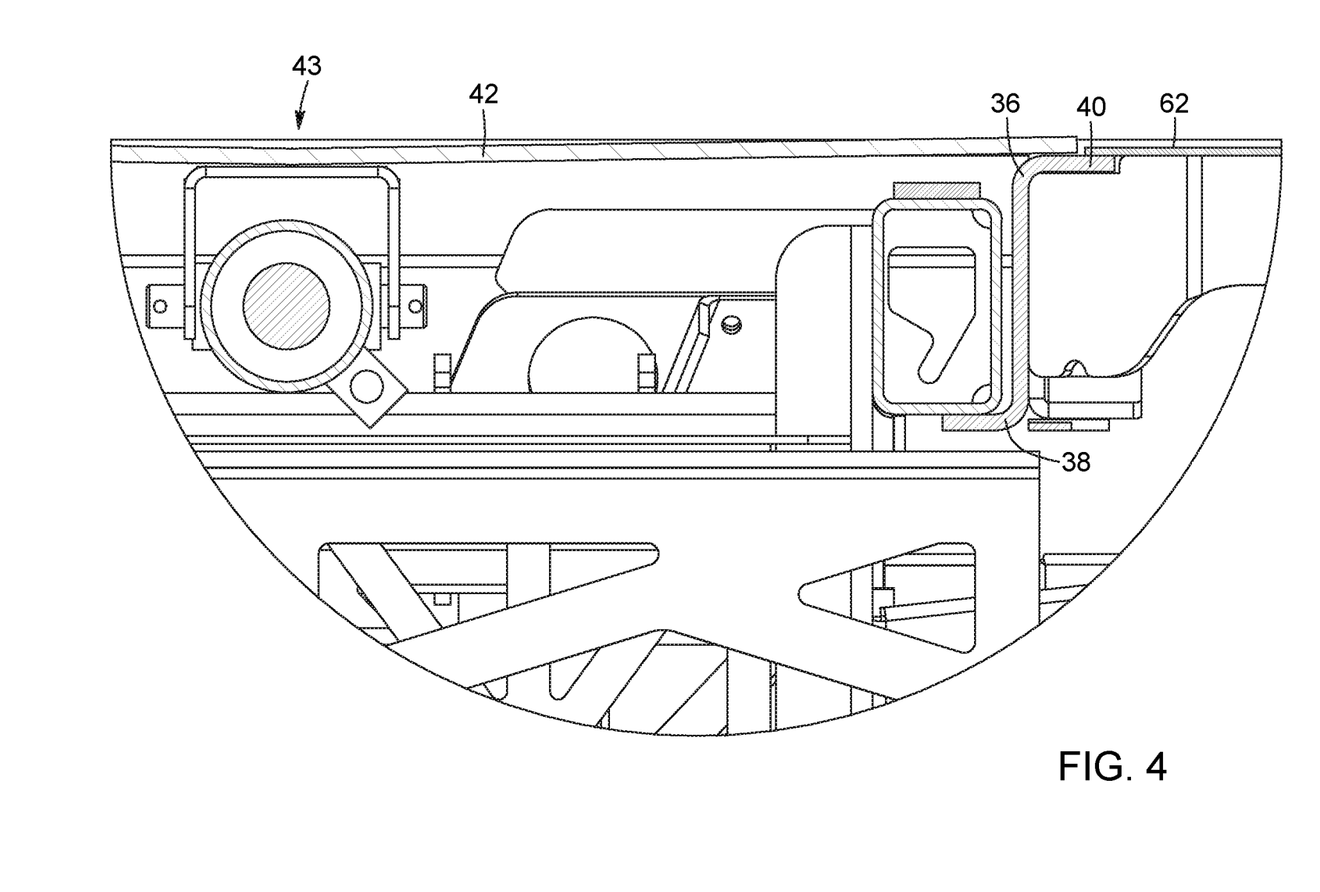
FIG. 4 is an enlarged view of section 4 of FIG. 3.
Figure 5:
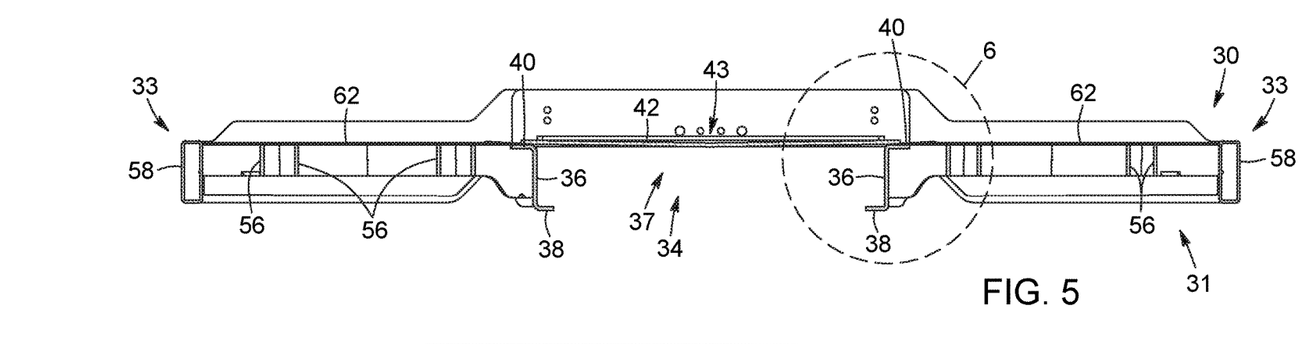
FIG. 5 is a sectional view along section lines 5-5 of FIG. 2 of the loading platform shown in FIG. 1.
Figure 6:
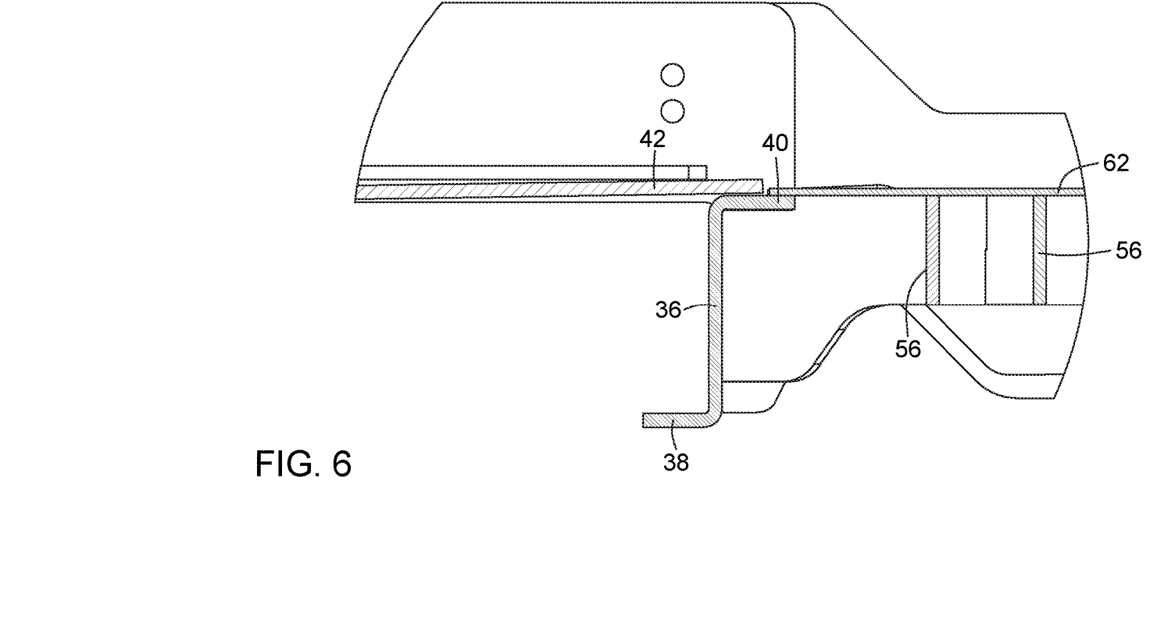
FIG. 6 is an enlarged view of section 6 of FIG. 5.

Referring to FIG. 4, in the embodiment shown, adjacent edge portions of the lateral floor plates 62 and the central plate 42 are both abutted against the upper transversal sections 40 of the intermediate beams 36. As mentioned above, in the embodiment shown, adjacent edge portions of the lateral floor plates 62 and the central plate 42 are proximate to one another. In an embodiment the adjacent edge portions of the lateral floor plates 62 and the central plate 42 can also be secured to one another, for example and without being limitative by welding.

In an embodiment (not shown), the upper surface of the lateral floor plates 62 can include a slip resistance 3D pattern in order to increase slip resistance. For example and without being limitative, in an embodiment, the slip resistance 3D pattern can include raised diamonds, raised lines, or the like.

Referring to FIGS. 1, 2 and 9, in the embodiment shown, in the forward end section 46 of the lattice frame assembly 31 of the frame 30, the intermediate beams 36 are connected to a respective one of the longitudinally extending outer beams 58 through vertically extending forward end members 68. The vertically extending forward end members 68 are secured to the forward end of the intermediate beams 36 and the longitudinally extending outer beams 58, for example and without being limitative by welding. The vertically extending forward end members 68, operate as forward end cross members extending between the two spaced-apart intermediate beams 36 of the elongated central shell 34 at the front end 34a of the elongated central shell 34. The vertically extending forward end members 68 reinforce transversally the platform 20 in the front end section 46 and, in combination with other elements provided in the rear end section 48, substantially prevent torsion of the platform 20 upon loading thereof.

In an embodiment, in the forward end section 46 of the frame 30, the intermediate beams 36 are also connected to a respective one of the longitudinally extending outer beams 58 through forward end plates 64 of the of the load-supporting floor 32. The forward end plates 64 are secured to the upper transversal section 40 (or the upper ends) of the respective one of the intermediate beams 36 and the longitudinally extending outer beams 58, for example and without being limitative by welding. In the embodiment shown, each one of the forward end plates 64 has a raised section secured to the corresponding intermediate beam 36 and a lower section secured to the corresponding longitudinally extending outer beam 58. The raised section and lower section of the forward end plates 64 define cavities 66 in the forward end section 46 of the platform 20, which can be used, for example and without being limitative, to receive and contain items. In an embodiment, the forward end members 68 can also be secured to an edge of the forward end plates 64, for example and without being limitative by welding.

Similarly, in the embodiment shown, the lattice frame assembly 31 of the frame 30 further includes forward transversally extending members 70, extending transversally between the intermediate beams 36 and the longitudinally extending outer beams 58, at the junction of the forward end section 46 and the central section 50 and are secured thereto, for example and without being limitative by welding. Each one of the forward transversally extending members 70 extends forwardly of the respective one of the cross bracing assemblies 54, along a direction substantially perpendicular to the longitudinal axis L. In the embodiment shown, one pair of forward transversally extending members 70 is provided (i.e. one of the forward transversally extending members 70 extends forwardly of each one of the two cross bracing assemblies 54), but one skilled in the art will understand that, in alternative embodiments, more than one pair of forward transversally extending members 70 can be provided. In the embodiment shown, the two forward transversally extending members 70 are transversally spaced-apart from one another with the central shell 34 and, more particularly, the intermediate beam 36 extending inbetween.

As mentioned above, in the embodiment shown, the central shell 34 extends in the forward end section 46 of the frame 30.

Figure 10:
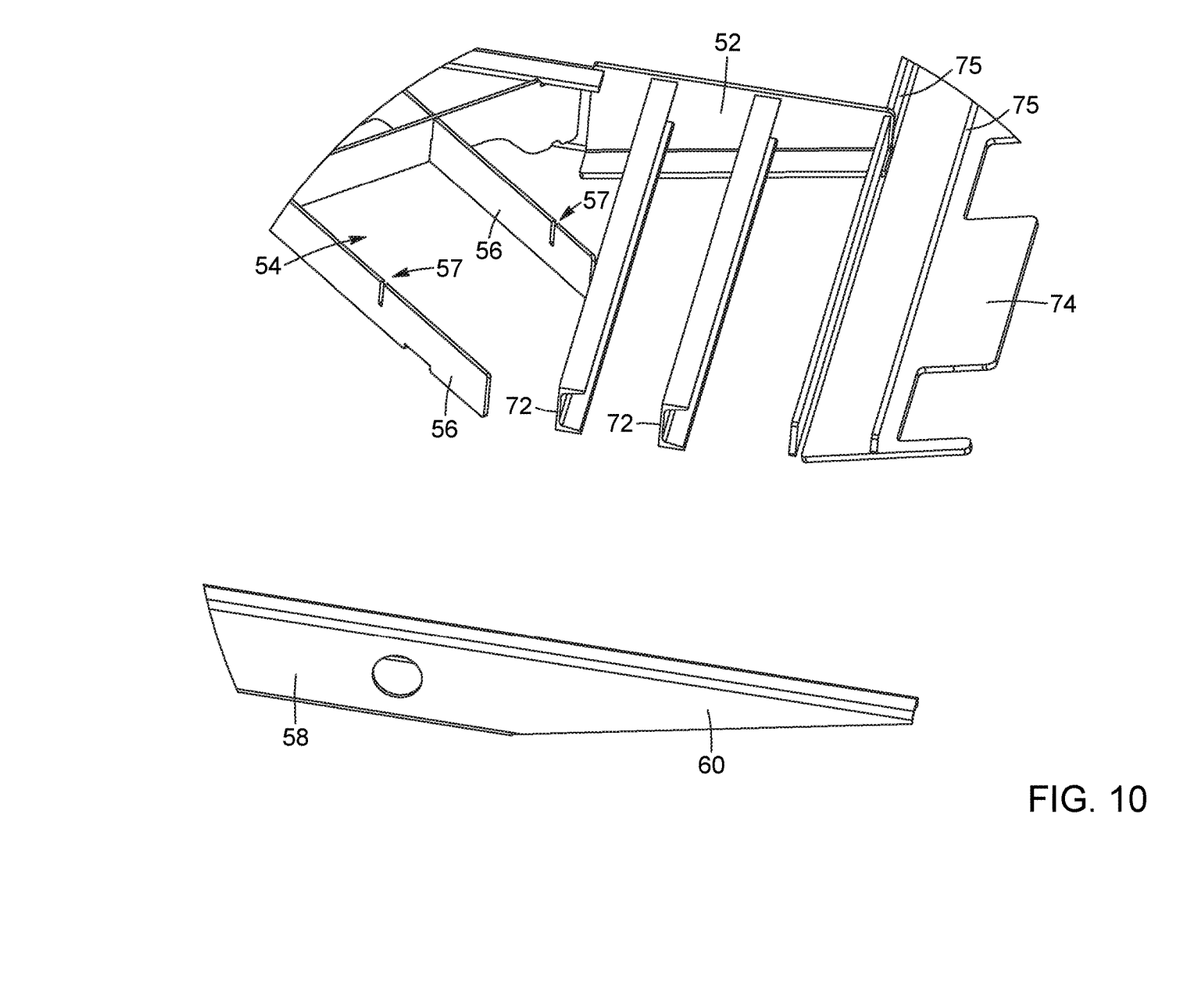
FIG. 10 is an enlarged view of section 10 of FIG. 9.

In the embodiment shown, the lattice frame assembly 31 of the frame 30 further includes tapered extension members 52 extending rearwardly from a respective one of the intermediate beams 36 in the rearward end section 48 (see FIGS. 9 and 10). The angle of the tapered extension members 52 substantially corresponds to the approach angle of the platform 20 in the loading/unloading configuration.

In the embodiment shown, in the rearward end section 48, rear transversally extending members 72 extend between the tapered extension members 52 and the longitudinally extending outer beams 58, on each outer side of the tapered extension members 52 extending from a respective one of the intermediate beams 36 of the central shell 34. In an embodiment, the rear transversally extending members 72 are secured to the tapered extension members 52 aligned with a respective one of the intermediate beams 36, on an outer side thereof, and the longitudinally extending outer beams 58, on an inner side thereof, for example and without being limitative by welding. Each one of the rear transversally extending members 72 extends rearwardly of the respective one of the cross bracing assemblies 54, along a direction substantially perpendicular to the longitudinal axis L.

In the embodiment shown, the rear transversally extending members 72 are C-shaped but it is appreciated that, in alternative embodiments (not shown) the shape of the rear transversally extending members 72 can be different from the embodiment shown. In the embodiment shown, two pairs of rear transversally extending members 72 are provided (i.e. two rear transversally extending members 72 extend rearwardly of each respective one of the two cross bracing assemblies 54), however one skilled in the art will understand that, in alternative embodiments, only one or more than two pairs of rear transversally extending members 72 can be provided.

In the embodiment shown, the lattice frame assembly 31 of the frame 30 also includes a transversally-extending bottom plate (or support member) 74 also extending between the two longitudinally extending outer beams 58 in the rear end section 48 of the platform 20. The transversally extending bottom plate 74 is secured to the lower edges of the longitudinally extending outer beams 58, in the tapered end section 60, and to the rear ends of the tapered extension members 52. Once again, the transversally-extending bottom plate 74 can be secured to the longitudinally extending outer beams 58, in the tapered end section 60, and to the rear ends of the tapered extension members 52, for example and without being limitative by welding. In view of the above, one skilled in the art will understand that the transversally-extending bottom plate 74 is inclined in the loading/unloading configuration with respect to the road and follows the shape of the tapered end section 60 of the longitudinally extending outer beams 58.

In view of the above, it is understood that the transversally-extending bottom plate 74 therefore operate as rear end cross member extending between the two spaced-apart intermediate beams 36 of the elongated central shell 34 at the rear end 34b thereof and, more particularly, between the two spaced-apart longitudinally extending outer beams 58.

In the embodiment shown, the transversally extending members 72 and the transversally extending bottom plate 74 are covered by a single piece rear floor plate 76 of the load-supporting floor 32. At the rearward point, an acute angle is defined between the transversally extending bottom plate 74 and the rear floor plate 76. The rear floor plate 76 of the load-supporting floor 32 is operatively secured to the longitudinally extending outer beams 58, for example and without being limitative through securing of the rear floor plate 76 to the upper ends of the longitudinally extending outer beams 58, the upper ends of the transversally extending members 72, and/or the rear end of the transversally-extending bottom plate 74, for example and without being limitative by welding. The rear floor plate 76 is wider than the central plate 42 along a transversal axis extending perpendicular to the longitudinal axis L. In the embodiment shown, the rear floor plate 76 is substantially levelled with the central plate 42.

Referring now to FIGS. 9 and 10, in the embodiment shown, rearward end section 48 of the frame 30 also includes two additional transversal connecting plates (or support members) 75, extending between the transversally-extending bottom plate 74 and the rear floor plate 76 and secured thereto, for example and without being limitative by welding. In the embodiment shown, an inner one of the transversal connecting plates 75 is also secured to the rear ends of the tapered extension members 52, on an inner side thereof, for example and without being limitative by welding. One skilled in the art will understand that, in alternative embodiments, only one or more than two additional transversal connecting plates 75 can be provided.

Similarly to the vertically extending forward end members 68, the transversally-extending bottom plate 74 and the transversal connecting plates 75 reinforce transversally the platform 20 in the rear end section 48 and, in combination with the vertically extending forward end members 68, amongst others, substantially prevent torsion of the platform 20 upon loading thereof.

In an embodiment, the combination of the rear floor plate 76 of the load-supporting floor 32, the transversally extending members 72, the transversally-extending bottom plate 74, and the transversal connecting plates 75 cooperate to reinforce transversally the platform 20 in the rear end section 48 and, in combination with the vertically extending forward end members 68, amongst others, substantially prevent torsion of the platform 20 upon loading thereof.

In an embodiment, the load-supporting floor 32 is defined by a combination of the central plate 42, the lateral floor plate 62, and the rear floor plate 76. The load-supporting floor 32 comprises at least one plate supported directly by the lattice frame assembly 31 of the frame 30 and, more particularly superposed directly to the intermediate beams 36 and the longitudinally extending outer beams 58.

In view of the above described design, in a non-limitative embodiment, the resulting platform can have a thickness of about 6 inches.

In an embodiment, most of the structural components of the frame 30 are made of high quality steel, such as quenched steel. In an embodiment, high quality steel such as CHT-400™ or AlgoTuf® of a thickness of more than about ⅜ inch can be used. In an embodiment, galvanized steel can be used for some or all the steel-based components.

In an embodiment, the front end cross members and the rear end cross members (i.e. the vertically extending forward end members 68 and the transversally extending bottom plate 74 and, optionally, transversal connecting plates 75) are made of material offering high mechanical properties and, more particularly, a high stiffness. In order to achieve such high stiffness, in a non-limitative embodiment, the front end cross members and the rear end cross members are made of abrasion-resistant heat treated steel having a thickness of at least about 0.5 inch. In an embodiment, abrasion-resistant heat treated steel is made of low carbon steel (steel having a carbon content below about 0.3 wt %) having at least one of a tensile strength of at least about 175 Ksi, a yield strength of at least about 145 Ksi, a hardness of at least about 350 BHN, a bending radius (transverse) of at least about 3 t and a bending radius (parallel) of at least about 4 t.

In an embodiment, other components, such for example and without being limitative, the forward end plates 64 and/or the rear floor plate 76 are also made of the above described material offering high mechanical properties and, more particularly, a high stiffness.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A loading platform for a wheeled vehicle, the loading platform comprising:
   a frame extending along a longitudinal axis, the frame comprising:
      an elongated central shell having two spaced-apart elongated beams each having an upper end and an elongated central plate secured to and connecting the upper end of each one of the spaced-apart elongated beams, and
      cross bracing assemblies extending on opposed sides of the elongated central shell, each one of the cross bracing assemblies including a plurality of intersecting bracing plates secured at a proximal end to a respective one of the elongated beams of the central shell, the intersecting bracing plates of each one of the cross bracing assemblies being arranged in a criss-cross pattern; and
      lateral floor plates each extending longitudinally on a respective side of the central plate and being supported by and secured to a respective one of the cross bracing assemblies, each one of the lateral floor plates being substantially leveled with the central plate.

2. The loading platform of claim 1, at wherein the central plate and the lateral floor plates together define a single piece.

3. A loading platform for a wheeled vehicle, the loading platform comprising:
   a frame extending along a longitudinal axis, the frame comprising:
      an elongated central shell having two spaced-apart elongated beams each having an upper end and an elongated central plate secured to and connecting the upper end of each one of the spaced-apart elongated beams;
      cross bracing assemblies extending on opposed sides of the elongated central shell, each one of the cross bracing assemblies including a plurality of intersecting bracing plates secured at a proximal end to a respective one of the elongated beams of the central shell;
   two spaced-apart longitudinal edges and a load-supporting floor including the elongated central plate and a rear floor plate; and
   a supporting frame assembly extending below and supporting the load-supporting floor, the supporting frame assembly comprising the two spaced-apart elongated beams, the spaced-apart elongated beams and the central plate defining together the elongated central shell having a central shell forward end and a central shell rear end;
   wherein the supporting frame assembly further comprises a front end cross member extending between the spaced-apart longitudinal edges of the frame and being secured to the spaced-apart elongated beams of the elongated central shell at the central shell forward end; and
   wherein the rear floor plate extends transversally between the two spaced-apart longitudinal edges of the frame and is substantially leveled with the central plate.

4. The loading platform of claim 3, wherein the central plate secured to the upper end of each one of the elongated beams comprises a V-shaped plate defining a depression extending along the longitudinal axis.

5. The loading platform of claim 3, wherein the rear floor plate is a single piece component wider than the central plate along a transversal axis extending perpendicular to the longitudinal axis of the frame.

6. The loading platform of claim 3, wherein the front end cross member and the rear floor plate are made of low carbon steel having at least one of a tensile strength of at least about 175 Ksi, a yield strength of at least about 145 Ksi, a hardness of at least about 350 BHN, a transverse bending radius of at least about 3 t and a parallel bending radius of at least about 4 t.

7. The loading platform of claim 3, wherein the two spaced-apart elongated beams of the elongated central shell are one of C-Shaped elongated beams and Z-Shaped elongated beams.

8. The loading platform of claim 3, wherein the supporting frame assembly further comprises two longitudinally extending outer beams, each one of the longitudinally extending outer beams having an upper end and extending on an outer side of a respective one of the cross bracing assemblies and the plurality of intersecting bracing plates of the respective one of the cross bracing assemblies being secured at a distal end to a respective one of the longitudinally extending outer beams.

9. The loading platform of claim 8, wherein the supporting frame assembly further comprises at least one transversally extending support member extending continuously between the two longitudinally extending outer beams, the at least one transversally extending support member supporting and being secured to the rear floor plate.

10. The loading platform of claim 8, wherein the load-supporting floor further comprises two forward end plates extending rearwardly from the central shell forward end, each one of the forward end plates being secured, at a first end, to the upper end of a respective one of elongated beams of the elongated central shell and, at a second end, to the upper end of a respective one of the two longitudinally extending outer beams, each one of the forward end plates extending laterally on a respective side of the central plate and being secured to the front end cross member.

11. The loading platform of claim 8, wherein the load-supporting floor further comprises two lateral floor plates, each one of the two lateral floor plates covering a respective one of the cross bracing assemblies and having a first marginal edge secured to the upper end of a respective one of the two longitudinally extending outer beams and a second marginal edge secured to the upper end of a respective one of the two elongated beams of the elongated central shell.

12. The loading platform of claim 3, wherein the loading platform has a platform forward end and a platform rear end, the central shell forward end being substantially aligned longitudinally with the platform forward end and the central shell rear end extending forwardly of the platform rear end.

13. A loading platform for a wheeled vehicle, the loading platform being tiltable and the wheeled vehicle comprising a vehicle subframe, the loading platform comprising:
- a frame extending along a longitudinal axis and defining a forward end section, a rearward end section, and a central section extending between the forward end section and the rearward end section, the frame comprising:
  - an elongated central shell having two spaced-apart elongated beams each having an upper end and an elongated central plate secured to and connecting the upper end of each one of the spaced-apart elongated beams;
  - cross bracing assemblies extending on opposed sides of the elongated central shell, each one of the cross bracing assemblies including a plurality of intersecting bracing plates secured at a proximal end to a respective one of the elongated beams of the central shell;
- two spaced-apart longitudinal edges and a load-supporting floor including the central plate; and
- a supporting frame assembly extending below and supporting the load-supporting floor, the supporting frame assembly comprising the two spaced-apart elongated beams, the spaced-apart elongated beams and the central plate defining together the elongated central shell with a translation path extending inbetween the spaced-apart elongated beams in the central section of the frame, the translation path being unobstructed; and
- the loading platform further comprising a displacement system mounted to the vehicle subframe and having arms, each one of the arms being translatably mounted to a respective one of the spaced-apart elongated beams and translating along the translation path.

14. The loading platform of claim 13, wherein the forward end section, the rearward end section and the central section each have a length and wherein the length of the central section is greater than the length of the forward end section and greater than the length of the rearward end section.

15. The loading platform of claim 13, wherein the central section is free of any transversal member extending continuously between the longitudinal edges.

16. The loading platform of claim 13, wherein transversally and continuously extending transversal members are provided solely in the forward end section and the rearward end section.

17. The loading platform of claim 1, wherein the central plate secured to the upper end of each one of the elongated beams comprises a V-shaped plate defining a depression extending along the longitudinal axis.

18. The loading platform of claim 1, wherein the two spaced-apart elongated beams of the elongated central shell are one of C-shaped elongated beams and Z-shaped elongated beams.

19. The loading platform of claim 13, wherein the central plate secured to the upper end of each one of the elongated beams comprises a V-shaped plate defining a depression extending along the longitudinal axis.

20. The loading platform of claim 13, wherein the two spaced-apart elongated beams of the elongated central shell are one of C-shaped elongated beams and Z-shaped elongated beams.

* * * * *